UNITED STATES PATENT OFFICE.

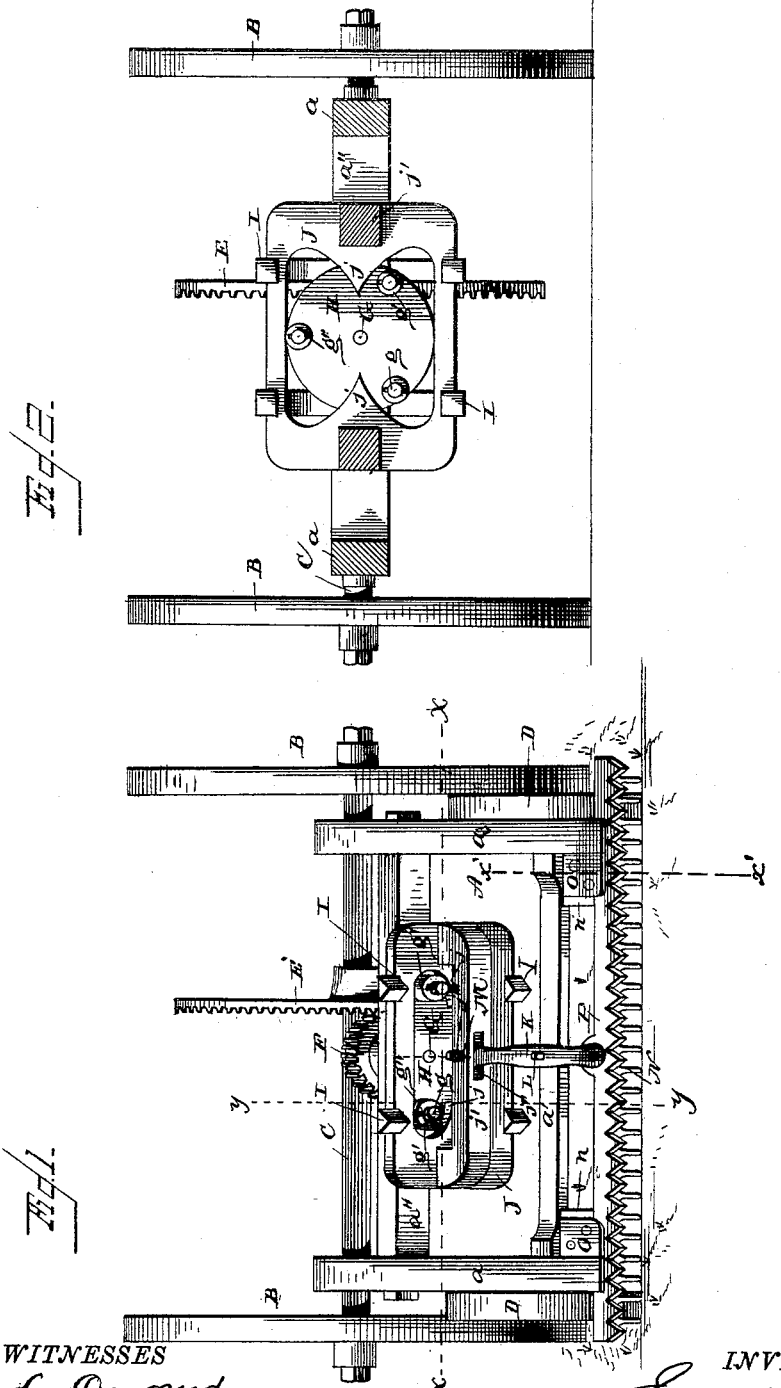

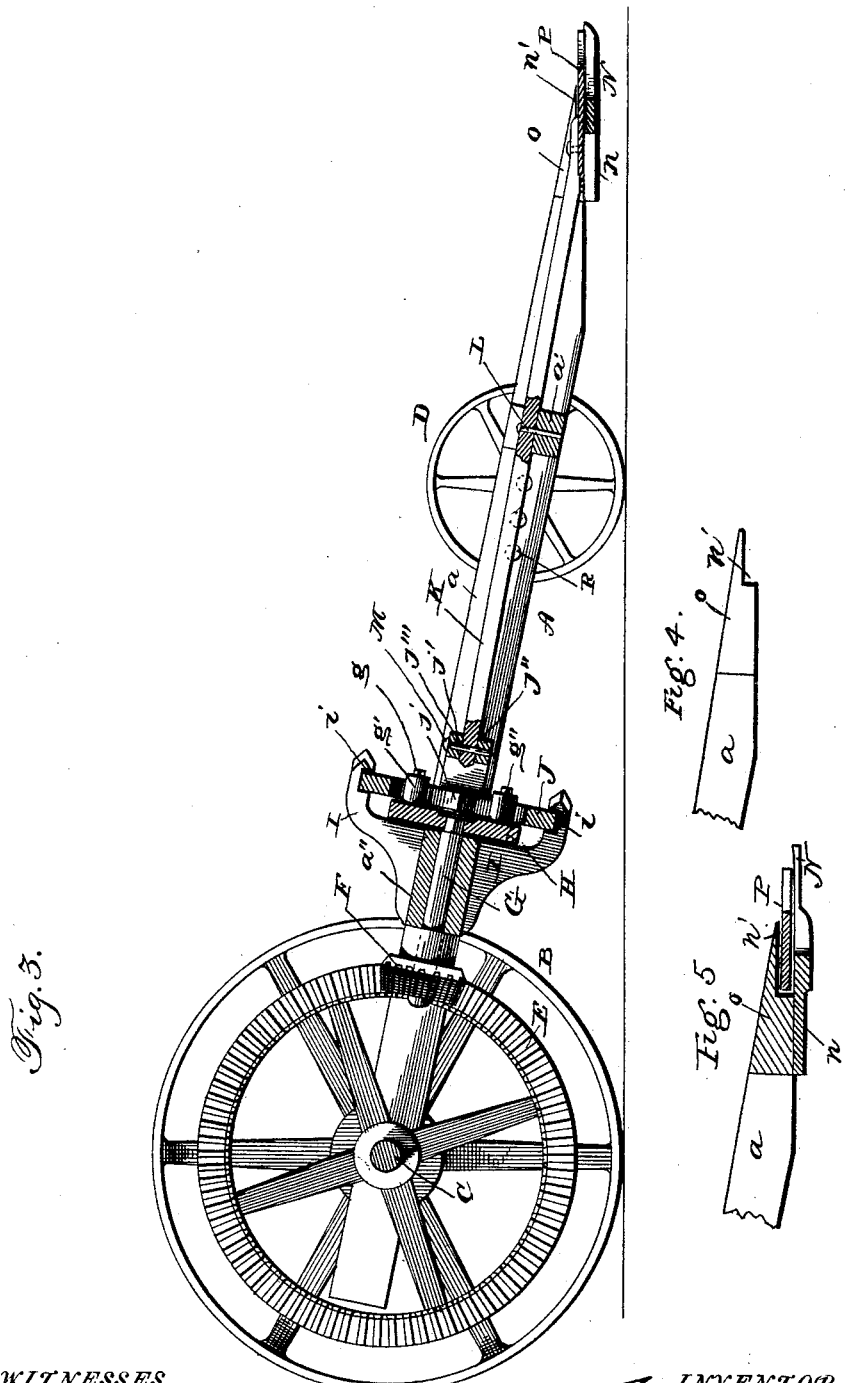

LAURISTON S. BROWN, OF ORISKANY FALLS, NEW YORK, ASSIGNOR OF ONE-HALF TO MINNIE L. BROWN, OF SAME PLACE, AND CORA A. TODD, OF LEBANON, MISSOURI.

LAWN-MOWER.

SPECIFICATION forming part of Letters Patent No. 407,163, dated July 16, 1889.

Application filed September 10, 1888. Serial No. 285,047. (No model.)

*To all whom it may concern:*

Be it known that I, LAURISTON S. BROWN, a citizen of the United States, and a resident of Oriskany Falls, in the county of Oneida and State of New York, have invented certain new and useful Improvements in Lawn-Mowers; and I do hereby declare that the following is a full, clear, and exact description of the invention, which will enable others skilled in the art to which it appertains to make and use the same, reference being had to the accompanying drawings, which form a part of this specification, and in which—

Figure 1 is a front view of my improved lawn-mower. Fig. 2 is a cross-section on line $x\,x$ of Fig. 1. Fig. 3 is a longitudinal sectional view taken on line $y\,y$ in Fig. 1. Fig. 4 is a side view illustrating one of the blocks O and a portion of the side piece. Fig. 5 is a detail sectional view of the front part of the mower on the line $x'\,x'$ of Fig. 1.

Similar letters of reference denote corresponding parts in all the figures.

My invention has relation to lawn-mowers; and it consists in providing means for operating the same; furthermore, in the arrangement and construction of the said means, and, finally, in producing a device which shall be simple of construction, durable in use, and comparatively inexpensive of production.

In the accompanying drawings, the letter A designates the frame of the mower, and consists of the parallel side pieces $a\,a$, the forward cross-piece $a'$ and the rear cross-piece $a''$. Journaled to the rear portion of the frame are two drive-wheels B, fixed to the ends of the axle C, which projects through the side pieces.

D indicates the wheels journaled to the side pieces near their forward ends. These wheels, in conjunction with the rear or drive wheels, support the frame in an inclined position above the ground, bringing the forward end of the frame nearer the ground than the rear end.

Keyed to the axle C, near its central portion, is a crown-wheel E, which meshes with a pinion F, secured to a short shaft G, journaled in the rear cross-piece hereinbefore mentioned. To the forward end of this short shaft is fixed a disk H, provided with forwardly-projecting pins $g$, to which are journaled rollers $g'$, held in place by pins $g''$, inserted through holes in the ends of the pins $g$.

Bracket-arms I are secured to the rear cross-piece of the machine-frame, above and below the said cross-piece, and are formed with notches or grooves $i$ in their inner faces. A frame J, having a rectangular opening, is seated in the notches or recesses of the bracket-arms, and has projecting from its inner sides inclined or curved spurs $j$, which are engaged by the rollers upon the pins of the disk.

The rectangular frame is provided with an arm $j'$, which extends laterally across the forward face of the said frame, and which is provided with a transverse slot $j''$, intersected by a vertical aperture $j'''$.

K denotes a pitman, pivoted at its intermediate portion, by means of the bolt L, to the forward cross-piece, and at its rear portion in the transverse slot or aperture of the arm of the rectangular frame by a pin M, inserted through the vertical aperture of the said arm.

N denotes the finger-bar provided with rearwardly-extending arms $n$, by means of which it is attached to the blocks O, bolted to the inner sides of the parallel side pieces of the machine-frame at its forward end. These blocks have recesses $n'$ in their front ends, as shown in Fig. 4, to receive the rear edge of the cutter.

To the forward end of the pitman hereinbefore mentioned is pivoted the reciprocating cutter P, which slides in the recesses of the blocks O.

The operation of the invention is as follows: The motion imparted to the pinion upon the short shaft by the crown-wheel upon the axle of the drive-wheels causes the disk upon the forward end of the said short shaft to revolve. This movement of the disk will in turn cause the pins carrying the rollers to ride upon the curved or inclined spurs of the rectangular frame, which will thus be reciprocated laterally in its bearings. By the lateral reciprocation of the rectangular frame the pitman is made to vibrate, which causes the movable cutter to reciprocate in the usual manner. By this style of mechanism the reciprocating cutter is caused to reciprocate a great number of times to one revolution of the drive-wheels, thus causing the grass to be quickly cut.

If it is desired to cut the grass at different lengths above the ground, the front wheels may be journaled in bearings R a distance rearward of the bearings in which they are now shown journaled, thus causing the forward or cutting end of the machine to be elevated.

From the foregoing description, taken in connection with the accompanying drawings, the operation and advantages of my invention will be understood at a glance. It will be seen that it is composed of but a few parts, and can consequently, as hereinbefore stated, be made at a comparatively small cost.

The mechanism employed to operate the mower is of such construction that the friction between the parts is reduced to a minimum, thus obviating the friction incident to machines employing a multiplicity of gear-wheels.

Having thus described my invention, I claim and desire to secure by Letters Patent of the United States—

1. In a lawn-mower, the combination, with the rotary disk provided with the pins projecting from its face, and rollers mounted on said pins, of bracket-arms secured to the main frame, a transverse frame supported and retained in place by said bracket-arms and provided with a rectangular opening having spurs $j$ at its opposite sides, an arm $j'$, extending laterally across the forward face of the transverse frame and provided with rearwardly-curved ends attached to said frame, and a centrally-located transverse slot $j''$, intersected by a centrally-disposed aperture, and a pitman pivoted in the slot of the arm $j'$ at one end, pivoted through its intermediate portion upon the main frame, and connected at its other end to the reciprocating cutter-bar of the cutting mechanism, substantially as specified.

2. In a lawn-mower, the combination, with a crown-wheel mounted on the axle, a pinion meshing with said crown-wheel, a shaft journaled longitudinally in the main frame of the mower and having said pinion on its rear end, the disk secured to the front end of said shaft with pins projecting from its face, and the anti-friction rollers on said pins, of the bracket-arms secured to the main frame, the transverse frame supported by and reciprocating upon said arms and provided with an opening having the curved spurs $j$, the transverse arm $j'$, secured to said reciprocating frame, the pitman pivoted at its rear end to said arm and intermediately to the main frame, and the cutter-bar pivoted to the front end of the pitman, substantially as specified.

3. In a lawn-mower, the combination, with the main frame provided with the adjusting-openings R in its side bars, and the wheels D, having shafts adapted to be journaled in any pair of the openings R to change the adjustment of the main frame, of the blocks O, bolted to the inner surfaces of the front ends of side bars of the main frame and having the horizontal recesses $n'$ in their front ends, the finger-bar having rearwardly-extending arms secured to said blocks, the cutter-bar with its rear edge seated in the recesses $n'$, the pitman pivoted to the main frame and at its front end to the cutter-bar, the reciprocating transverse open frame having the curved spurs $j$ in its opening and suitably supported upon the main frame, the arm or bar $j'$, secured to the transverse frame and having the rear end of the pitman pivoted upon it, the rotary disk provided with pins projecting from its face and mounted on a longitudinal shaft journaled in the main frame, and the anti-friction rollers mounted on said pins, substantially as specified.

In testimony that I claim the foregoing as my own I have hereunto affixed my signature in presence of two witnesses.

LAURISTON S. BROWN.

Witnesses:
E. D. GAYLORD,
F. B. MILLER.